US012317973B2

(12) United States Patent
Napoli et al.

(10) Patent No.: US 12,317,973 B2
(45) Date of Patent: Jun. 3, 2025

(54) PHOSPHORESCENT TIMEPIECE COMPONENT

(71) Applicant: The Swatch Group Research and Development Ltd, Marin (CH)

(72) Inventors: Sophie Napoli, Neuchâtel (CH); Nicolas François, Neuchâtel (CH)

(73) Assignee: The Swatch Group Research and Development Ltd, Marin (CH)

(*) Notice: Subject to any disclaimer, the term of this patent is extended or adjusted under 35 U.S.C. 154(b) by 337 days.

(21) Appl. No.: 17/468,926

(22) Filed: Sep. 8, 2021

(65) Prior Publication Data

US 2022/0183426 A1 Jun. 16, 2022

(30) Foreign Application Priority Data

Dec. 11, 2020 (EP) .................................... 20213368

(51) Int. Cl.
*A44C 5/00* (2006.01)
*G04B 19/32* (2006.01)
*G04B 37/22* (2006.01)

(52) U.S. Cl.
CPC ................ *A44C 5/00* (2013.01); *G04B 19/32* (2013.01); *G04B 37/22* (2013.01)

(58) Field of Classification Search
CPC ........... A44C 5/00; G04B 19/32; G04B 37/22
See application file for complete search history.

(56) References Cited

U.S. PATENT DOCUMENTS

| | | | | |
|---|---|---|---|---|
| 5,698,301 A * | 12/1997 | Yonetani | F21K 2/00 | 428/913 |
| 6,692,432 B1 * | 2/2004 | Yarush | A61B 1/00108 | 600/179 |
| 7,070,843 B2 * | 7/2006 | Bartek | B32B 11/00 | 428/354 |
| 8,570,149 B2 * | 10/2013 | Rowe | G06V 40/1318 | 340/5.82 |
| 9,193,209 B2 * | 11/2015 | Dooley | B41J 2/01 | |
| 10,101,009 B1 * | 10/2018 | Martin | F21V 9/30 | |
| 2002/0019312 A1 * | 2/2002 | Ramsden | B41M 5/035 | 503/227 |
| 2003/0016315 A1 * | 1/2003 | Ueno | G04G 9/0041 | 349/66 |

(Continued)

FOREIGN PATENT DOCUMENTS

| | | |
|---|---|---|
| CH | 716 226 B1 | 11/2020 |
| CN | 1125172 A | 6/1996 |

(Continued)

OTHER PUBLICATIONS

Excerpt from Britannica.com entry "Fluoroelastomer" (captured by Internet Achive on Apr. 15, 2019) (Year: 2019).*

(Continued)

*Primary Examiner* — Edwin A. Leon
*Assistant Examiner* — Sean R Brannon
(74) *Attorney, Agent, or Firm* — Sughrue Mion, PLLC

(57) ABSTRACT

A timepiece component including a phosphorescent multi-layer structure (3) comprising a front layer (1) with a transparent or translucent polymer matrix and comprising phosphorescent pigments and a reflective underlying layer (2).

10 Claims, 1 Drawing Sheet

(56) References Cited

U.S. PATENT DOCUMENTS

| | | | | |
|---|---|---|---|---|
| 2004/0043248 | A1* | 3/2004 | Bharti | B29C 63/0043 428/323 |
| 2017/0086536 | A1* | 3/2017 | de Iuliis et al. | A44C 5/107 |
| 2017/0162074 | A1* | 6/2017 | Cheatham | G09B 19/0076 |
| 2018/0095427 | A1* | 4/2018 | Francois | G04B 37/08 |
| 2019/0283309 | A1 | 9/2019 | Kato et al. | |
| 2020/0197755 | A1* | 6/2020 | Gallucci | A63C 5/122 |
| 2021/0088973 | A1* | 3/2021 | Francois | G04B 19/32 |

FOREIGN PATENT DOCUMENTS

| | | | |
|---|---|---|---|
| CN | 107918271 | A | 4/2018 |
| EP | 3 306 419 | A1 | 4/2018 |
| EP | 3 796 105 | A1 | 3/2021 |
| FR | 2 979 571 | A1 | 3/2013 |
| JP | 07-265111 | A | 10/1995 |
| JP | 10-39050 | A | 2/1998 |
| JP | 2001-24343 | A | 1/2001 |
| JP | 2003-304913 | A | 10/2003 |
| JP | 3185348 | U | 8/2013 |
| JP | 2019-162202 | A | 9/2019 |
| WO | 2010/063945 | A1 | 6/2010 |
| WO | 2019/115249 | A1 | 6/2019 |

OTHER PUBLICATIONS

Excerpt form Wikipedia article “Thermoplastic Polyurethane”, captured by the Internet Archive Mar. 1, 2019 (Year: 2019).*

Jinzhu Tan, Y.J. Chao, J.W. Van Zee, Xiaodong Li, Xinnan Wang, Min Yang, “Assessment of mechanical properties of fluoroelastomer and EPDM in a simulated PEM fuel cell environment by microindentation test”, Materials Science and Engineering: A, vol. 496, Issues 1-2, pp. 464-470 (Year: 2008).*

European Search Report for EP 20 21 3368, dated May 27, 2021.

* cited by examiner

PHOSPHORESCENT TIMEPIECE COMPONENT

CROSS REFERENCE TO RELATED APPLICATIONS

This application claims priority to European Patent Application No. 20213368.2 filed Dec. 11, 2020, the entire contents of which are incorporated herein by reference.

TECHNICAL FIELD

The invention relates to a multilayer phosphorescent horological component, in particular a watch bracelet.

TECHNOLOGICAL BACKGROUND

The use of photoluminescent materials is quite widespread on the market for various applications, such as tyres, signalling accessories, etc. (For example: U.S. Pat. No. 6,431,236B1, JPH10121424A).

Watch companies in particular provide phosphorescent silicone-based bracelets, and more recently the offer has been developed through a company proposing a watch with a phosphorescent rubber bracelet. For its luminescent synthetic rubber bracelet, this company adds pigments directly into the material, which is then hot moulded and pressed.

However, when the pigment is thus dispersed in the mass, a significant proportion of the light produced by the pigments is lost, either by absorption in the material in the case of thick layers, or by emission towards the rear face which is of no interest for the wearer. In this way, a large proportion of the expensive phosphorescent pigments is in practice unused.

SUMMARY OF THE INVENTION

The invention aims at providing a phosphorescent structure which does not suffer from the disadvantages described above.

The present invention relates to a timepiece component comprising a phosphorescent structure comprising a transparent or translucent front layer and comprising phosphorescent pigments and a reflective underlying layer.

Preferably, the two layers of the structure of the invention comprise a polymeric, advantageously elastomeric matrix.

Elastomeric means a material having an elastic modulus of less than 100 MPa, preferably less than 50 MPa. Particularly preferably, the elastomer has an elastic modulus of less than 10 MPa at 25° C.

Advantageously, the two layers comprise compatible polymers. Compatible, means that these two layers adhere to each other without the use of an adhesive layer.

Preferably, the polymers of the two layers comprise polymers of the same nature, differing essentially in the pigments and/or the fillers which are dispersed therein.

Advantageously, the front layer has a thickness comprised between 0.04 and 1 mm.

Preferably, the rear layer is made reflective by dispersing a white pigment such as, preferably, titanium oxide.

Advantageously, the phosphorescent pigment has a particle size, measured by sieving, of less than 30 μm.

Preferably, the front layer comprises at least 20% by weight of the phosphorescent pigment.

REFERENCES OF THE FIGURES

Figure 1:
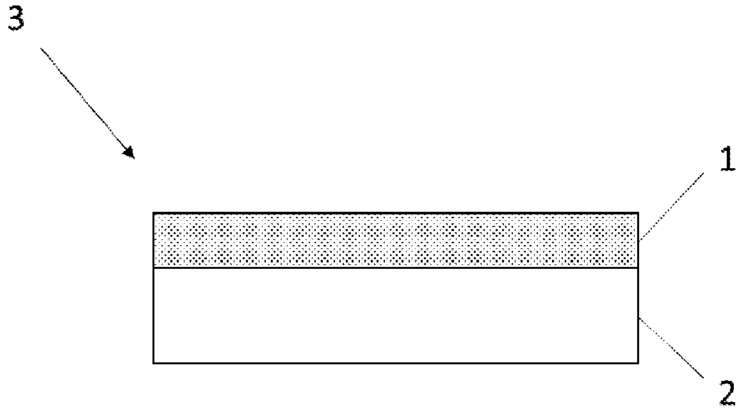
FIG. 1 is a schematic sectional view illustrating the phosphorescent multilayer structure of a timepiece component according to the invention.

1. Phosphorescent layer
2. Reflective layer
3. Watch bracelet
4. Watch

DETAILED DESCRIPTION

The present invention relates to a timepiece component comprising a phosphorescent multilayer structure allowing to maximise the luminous performances of the structure while minimising the amount of phosphorescent pigments in the complete structure. This structure is particularly adapted for the manufacture of a timepiece component intended to produce watch bracelets. It goes without saying that the horological component can also form other constituent elements of a wristwatch such as a watch dial, hands or else a bezel or a watch case.

According to the invention, the multilayer structure comprises a front face, intended to be seen in normal use, and a rear face intended, for example, to be in contact with the skin in the case of a watch bracelet.

According to the invention, the front face comprises a transparent or translucent polymeric front layer 1 comprising a phosphorescent pigment. The thickness of this layer is optimised so that the light emitted by the deepest pigments is not excessively absorbed by the material comprised between said deep pigment and the surface. Depending on the optical features of the polymer matrix of the layer, this layer has a thickness comprised between 30 μm and 1 mm.

A thin transparent layer can optionally be added on top of the phosphorescent layer, as long as it does not significantly absorb the emitted light. Such an additional layer can for example be added to improve the surface finish of the final product or to protect the area comprising the pigment.

Figure 2:
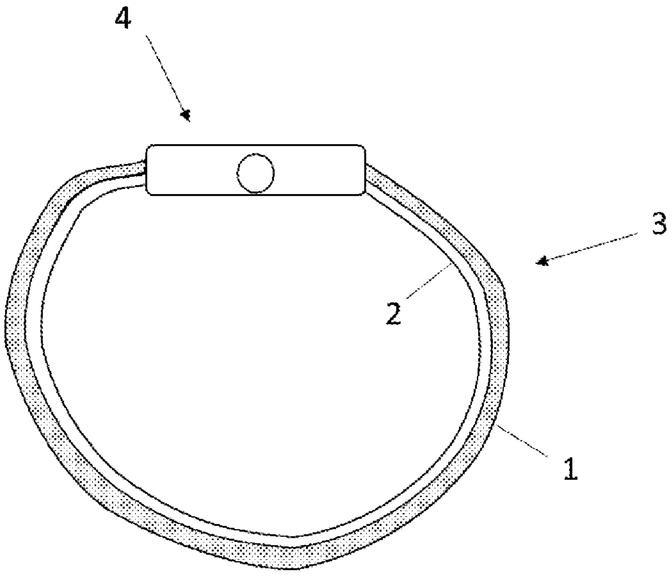
FIG. 2 shows a schematic view of a watch comprising a bracelet forming a horological component according to the invention.

A reflective layer 2 is disposed under the front layer. This layer can either be a thin reflective layer such as a thin metal layer deposited for example by evaporation or plasma deposition on a substrate, or, preferably, a layer of polymer charged with a reflective pigment such as, for example, titanium oxide. This layer can also be deposited on a substrate or even be a self-supporting layer. This layer 2 can for example form the rear layer 2 of the bracelet in contact with the skin as shown in FIGS. 1 and 2. However, the structure could comprise a third layer (not shown) which is for example coloured, for example disposed the on top of the front layer 1, the important thing to solve the aforementioned problem being that the layer immediately under the phosphorescent layer is reflective.

The small size of the $TiO_2$ particles (typically comprised between 200 nm and 400 nm) maximises the reflection of visible light. The base mixture advantageously comprises an elastomer, a vulcanisation system, silica, titanium oxide and an optical brightener.

In order to have sufficient reflection, the reflecting layer, when it is polymeric in nature as described above, has a thickness of at least 20 μm, preferably at least 40 μm.

The front layer 1 and the reflective layer, when it is of polymeric nature, are preferably selected from the group comprising a fluorinated elastomer of the FKM family or a thermoplastic elastomeric polymer of the TPU (Polyurethanes), EVA (Ethylene vinyl acetate copolymer), silicone, EPR (ethylene propylene rubber) family and their thermoplastic derivatives (TPO) or else from the family of acrylic elastomers, or a mixture of the latter.

In the case of a watch bracelet, the total thickness of the rear layer, under the phosphorescent layer, therefore comprising the reflective layer 2 and an optional additional layer, has a thickness comprised between 20 μm and 1.5 mm.

Three shaping techniques are preferred for making bracelets:

- The lower layer can be moulded onto the upper phosphorescent elastomer layer (or vice versa)
- The phosphorescent layer can be produced by moulding and the reflective layer can be coated by spraying.
- The two layers (produced separately by injection or compression) can be assembled using the "saddle bracelet" type shaping technique: the two layers are glued and sewn together to form a bracelet.

EXEMPLARY EMBODIMENT

A. Preparation of the Substrate.

A fluoroelastomer is prepared by mixing a pure FKM Tecnoflon® P-457 grade from Slovay by working on an open mixer with 5% titanium oxide.

At the end of the mixing, a vulcanisation system is added (2.5% by weight of Luperox® 101XL-45+3% by weight of Drimix® TAIC 75%, the percentages being expressed relative to the polymer).

Preferably, Nafol 1822B™ oil marketed by Sasol (up to 1.8%) is also added. The whole constitutes the ready-to-shape reflective FKM mixture.

This mixture is shaped by compression and partially crosslinked.

B. Preparation of the Phosphorescent Layer

The following masterbatch is produced:

Pure FKM Tecnoflon® P-457 grade by Solvay which is produced on a clean line and which is transparent is used as the masterbatch matrix.

Tecnoflon® P-457 is diluted in a 1:1 ratio in methyl ethyl ketone (Methyl Ether Ketone or MEK).

A photoluminescent pigment previously sieved at 30 μm is incorporated into the mixture obtained in the previous step, the amount of pigment being in a ratio 1:1 with respect to Tecnoflon® P-457 and the whole is mixed in a high speed mixer at 3000 rpm.

A fluorochrome is introduced in an amount of 0.5% relative to the total (that is to say 1.5% relative to the FKM polymer) and the whole is again mixed in a high speed mixer at 3000 rpm.

The solvent is evaporated in an oven at 80° C. until the solvent is removed.

The masterbatch produced beforehand is incorporated up to a minimum of 60% in a pure FKM P-457 by working on an open mixer.

At the end of the mixing, a vulcanisation system is added (2.5% by weight of Luperox® 101XL-45+3% by weight of Drimix® TAIC 75%, the percentages being expressed relative to the polymer).

Preferably, Nafol 1822B™ oil marketed by Sasol (up to 1.8%) is also added. The whole constitutes the optimised photoluminescent FKM mixture, ready to be shaped and crosslinked.

The mixture B obtained is then overmoulded by compression and crosslinked on the substrate A prepared beforehand.

The component thus obtained comprises a front layer of 100 μm having a pigment concentration of 30% adherent to a reflective elastomer layer comprising 10% of titanium oxide.

The invention claimed is:

1. A timepiece component comprising a phosphorescent multilayer structure comprising a front layer with a transparent or translucent polymer matrix comprising an elastomer matrix, and comprising phosphorescent pigments and a reflective underlying layer, wherein at least some of the phosphorescent pigments are on an outermost side of the timepiece component, the outermost side facing away from the reflective underlying layer, wherein the timepiece component forms a watch bracelet, wherein the front layer is arranged along an entire length of the bracelet, and wherein the phosphorescent pigments are evenly distributed throughout the front layer.

2. The timepiece component according to claim 1, wherein the underlying layer comprises a polymer matrix charged with a reflective pigment.

3. The timepiece component according to claim 2 wherein the reflective pigment comprises titanium oxide.

4. The timepiece component according to claim 2, wherein the polymer matrix of the underlying layer is compatible with the polymer matrix of the front layer.

5. The timepiece component according to claim 4, wherein the front layer and the underlying layer comprise a fluoroelastomer.

6. The timepiece component according to claim 1, wherein the front layer has a thickness comprised between 0.03 mm and 1 mm.

7. The timepiece component according to claim 1, wherein the elastomer matrix includes a material having an elastic modulus less than 100 MPa.

8. The timepiece component according to claim 1, wherein the front layer and the reflective underlying layer adhere to each other without using an adhesive.

9. A timepiece component comprising a phosphorescent multilayer structure (3) comprising a front layer (1) with a transparent or translucent polymer matrix and comprising phosphorescent pigments and a reflective underlying layer (2), wherein the front layer (1) comprises an elastomer matrix, and wherein the underlying layer (2) comprises a polymer matrix charged with a reflective pigment.

10. A timepiece component comprising a phosphorescent multilayer structure comprising a front layer with a transparent or translucent polymer matrix comprising an elastomer matrix, and comprising phosphorescent pigments and a reflective underlying layer, wherein at least some of the phosphorescent pigments are on an outermost side of the timepiece component, the outermost side facing away from the reflective underlying layer, wherein the front layer and the underlying layer comprise a fluoroelastomers, wherein the underlying layer comprises a polymer matrix charged with a reflective pigment, and the reflective pigment comprises titanium oxide, wherein the timepiece component forms a watch bracelet, wherein the polymer matrix of the underlying layer is compatible with the polymer matrix of the front layer, wherein the front layer is arranged along an entire length of the bracelet, wherein the phosphorescent pigments are evenly distributed throughout the front layer, wherein the front layer has a thickness comprised between 0.03 mm and 1 mm, and wherein the elastomer matrix includes a material having an elastic modulus less than 100 MPa.

* * * * *